Oct. 31, 1967   G. RYHINER ET AL   3,350,232
HOMEOPOROUS ELECTRODE FOR ELECTROCHEMICAL DEVICES, METHOD
OF ITS MANUFACTURE, AND FUEL CELL
INCORPORATING SUCH ELECTRODES
Filed June 21, 1963   2 Sheets-Sheet 1

INVENTORS
GUNTHER RYHINER
HANS H. VON DÖHREN AND
MARGARETE JUNG

United States Patent Office 3,350,232
Patented Oct. 31, 1967

3,350,232
HOMEOPOROUS ELECTRODE FOR ELECTRO-
CHEMICAL DEVICES, METHOD OF ITS
MANUFACTURE, AND FUEL CELL IN-
CORPORATING SUCH ELECTRODES
Gunther Ryhiner, Bad Soden, Taunus, Hans H. von
Döhren, Frankfurt am Main, and Margarete Jung,
Nieder-Eschbach, Taunus, Germany, assignors to Varta
Aktiengesellschaft, Hagen, Westphalia, Germany, a
corporation of Germany
Filed June 21, 1963, Ser. No. 289,686
Claims priority, application Germany, June 22, 1962,
A 40,506; Aug. 24, 1962, V 22,956
22 Claims. (Cl. 136—86)

The present invention relates to improvements in homeoporus electrodes for electrochemical devices, such as gas diffusion electrodes in fuel cells, depolarizers in galvanic elements, and electrolytic cell electrodes, their method of manufacture, and ion-exchange membrane fuel cells incorporating such electrodes.

Since its usefulness may be greatest in hydrogen-oxygen fuel cells, this invention will be described hereinafter in connection with such use.

In fuel cells of this type, hydrogen or a hydrogen-containing fuel is oxidized with oxygen or an oxygen-containing gas to convert the fuel directly into electric energy. For this purpose, gas diffusion electrodes are used to sorb and activate the fuel and oxidizing gases. For instance, a suitable gas diffusion electrode plate may be placed into a container to separate the same into two chambers, one of the chambers containing an electrolyte and a counter-electrode while the other chamber contains the operating gas. Due to the capillary pressure, the electrolyte will penetrate into the pores of the gas diffusion electrode from one side and the operating gas will be delivered to the other side of the electrode under a sufficient pressure to penetrate into its pores so as to form therein a three-phase boundary of electrode-electrolyte-gas which is necessary to produce the electrochemical conversion of the fuel.

If the gas diffusion electrodes pores are of different diameters, en equilibrium between the capillary pressure and gas pressure will pertain only in some of the pores, the pores which are too narrow will be completely filled or drowned by electrolyte, permitting no gas to enter thereinto, and the pores which are too wide will permit the gas to bubble through them into the electrolyte without electrochemical conversion within the pores.

Therefore, it has long been attempted to produce homeoporous gas diffusion electrodes with a multiplicity of fine pores of equal diameter and one such proposal was made in U.S. Patent No. 2,860,175, dated Nov. 11, 1958. However, the sintering process used therein is very time-consuming, produces insufficient porosity, and often unfavorably influences the catalytic properties of the electrode material. Also, sintering makes a uniform formation and distribution of the pores very difficult, if not impossible.

It is the primary object of the present invention to overcome these disadvantages and to produce a greatly improved homeoporous electrode.

It is another object of this invention to provide a method of manufacturing such homeoporous electrodes.

It is a further object of the invention to provide an improved fuel cell with a solid polyelectrolyte.

A homeoporous electrode according to the present invention is produced in the following manner:

A colloidal solution or a sol of a polyelectrolyte is covered with a solution of a non-alkali metal salt to produce an ionotropic gel which consists of a non-porous layer and a layer defining a multiplicity of fine, very evenly distributed and parallel conical capillaries of substantially the same size and shape.

The preferred polyelectrolyte content in the solution is 0.25% to 5%, by weight, and the polyelectrolyte must be capable of forming a colloidal aqueous solution in this concentration. Said polyelectrolyte may be a water-soluble salt of a polymeric acid, such as an alkali metal, ammonium or amine salt, and the ions of such a polyelectrolyte salt must be replaceable by non-alkali metal ions whereby gels of the salts of said polyelectrolytes with the non-alkali metal are formed which gels contain considerable amounts of water.

Alginates, pectins and carboxymethyl cellulose have been found to be especially useful polyelectrolytes and the sols are preferably prepared with the alkali metal salts of these polyelectrolytes, such as their sodium salts.

Since the pH of the sols influences the capillary diameter and since it is desired that these diameters be as small as possible for the purposes of the present invention, a pH of about 3 to 7 is the preferred pH-value for the polyelectrolyte salt solutions used in preparing the gels.

Useful non-alkali metal salts have been found to be the water-soluble salts, such as the nitrates, chlorides, sulfates, or acetates, of beryllium, heavy metals, such as copper, lead, cadmium, and the alkaline earth metals, such as calcium, strontium, and barium, as well as the rare earth metals of the lanthanide series, especially, lanthanum and cerium. 0.5 N to 2 N, preferably 1 N solutions of such metal salts are used.

As the ions of said non-alkali metal salts are diffused into the polyelectrolyte sol, a gel with capillaries extending in the direction of diffusion is formed, the walls of the capillaries consisting of the non-alkali metal polyelectrolyte formed by reaction with the salt solution and the substance within the capillary walls being a dilute aqueous salt solution.

The most uniform capillaries are produced with beryllium, lead, or copper salt solutions, wherefore they are preferred. Alkaline earth metal salts produce a rather uneven capillary distribution and, therefore, they are less preferred for the purpose of the present invention.

Alginate is the preferred polyelectrolyte and if lead nitrate is used as the electrolyte, the resultant lead alginate gel has capillaries of a median diameter of $8\mu$ and a distance of $3\mu$ from each other. Copper alginate gels form very uniform capillaries of somewhat larger diameters tapering from about $35\mu$ at the side of the sol to about $8\mu$ on the side of the electrolyte. Beryllium alginate gels have also very even capillaries but their diameters are about twice the size of those of copper alginates.

These gels consist to 98% of water and only to 2% of solid matter, wherefor they are chemically, thermally, and mechanically most sensitive and unstable. To stabilize the gel, the water therein is replaced by a suitable synthetic resin. Any polymerizable monomer or monomer mixture and polymer solutions may be used for this purpose, which do not destroy the capillary gel structure. Preferred synthetic resins are polyurethanes, urea polymers, polyacrylic acid polymers and their derivatives, polyolefins, and polyvinylchloride, i.e. synthetic resins which are highly resistant to the electrolytes in which the porous body is to be used.

The concentration of the monomer or polymer solution used to stabilize the gel depends on the solubility of the monomer or polymer. In view of their higher solubility, it is preferred to use polymeric materials of low molecular weight. Generally, the monomer or polymer content in the solution will be at least about 10%, by weight, preferably higher.

The stabilized gels thus contain a homeoporous layer and this layer may be made into a gas diffusion electrode of very large internal surface without losing its homeoporosity by coating its entire surface, i.e. its outer surface and the walls of the capillaries, with an electrically conductive material, preferably a metal. If the electrode is to be used in a fuel cell, the coating material must also have the required catalytic activity but if the electrode is designed for an electrolytic cell, only electrical conductivity is needed in the electrode material.

In one embodiment of this invention, the gel is designed as an electrode for use with liquid electrolyte in electrochemical devices. Therefore, the non-porous layer is removed so that the capillaries extend through the entire gel layer from one side thereof to the other.

In another embodiment of the invention, the entire polyelectrolyte gel is left intact to form after stabilizing an ion exchanging body with one homeoporous and one flat side. After coating both sides with catalytically active and current conducting material, said stabilized gel can directly be used as a fuel cell.

The above and other objects, advantages and features of the invention will become more apparent from a consideration of the detailed description of certain preferred embodiments thereof, taken in conjunction with the accompanying drawing wherein FIGS. 1 to 3 illustrate successive stages in the production of an ionotropic gel with a homeoporous layer;

Figure 1:
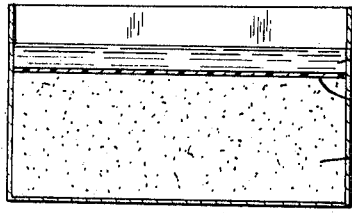
Figure 2:
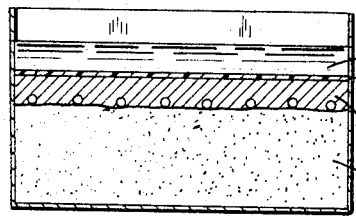
Figure 3:
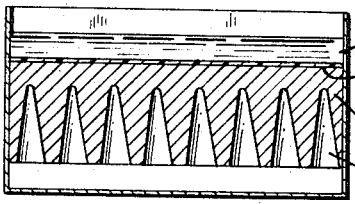

Referring now to the drawing and first to FIGS. 1 to 4, there is shown a colloidal polyelectrolyte solution 3 covered by an electrolyte solution layer 1. Immediately upon covering the polyelectrolyte sol with the electrolyte solution, the two phases are separated at their interface by a non-porous covering layer 2 (see FIG. 1). As shown in FIG. 2, the metallic ions of the electrolyte 1 diffuse through the covering layer 2 into the sol 3, forming further gel 4. Simultaneously, dehydration takes place and the released water is first collected in the form of a multitude of evenly distributed droplets almost immediately adjacent the lower face of the covering layer 2. As indicated in FIG. 3, the droplets receive additionally released water as the gel layer grows without merging into a single body of water or mixing with the gel. Rather, the growing droplets move all in the same direction away from the lower face of the covering layer and produce the conical capillaries 5 as the volume of the droplets increases, these capillaries tapering outwardly away from the covering layer and being very evenly distributed throughout the gel in parallel relationship, all capillaries being of substantially the same size and shape.

Figure 4:
FIG. 4 shows the homeoporous layer separated from the non-porous covering layer of the gel.

When it is desired to produce a homeoporous gas diffusion electrode from this gel, the non-porous covering layer of the gel membrane is removed, as shown in FIG. 4, so that the capillaries extend through the entire membrane from one side to the other.

Materials that have been used with good results in the production of the homeoporous gel illustrated in FIGS. 1 to 4 are an aqueous solution of N cupric nitrate, $Cu(NO_3)_2$ as electrolyte, and a 2% colloidal solution of sodium alginate as polyelectrolyte sol. Migration of the copper ions then produces a copper alginate gel.

It is a particular advantage of the gas diffusion electrodes made from such gels that the capillaries are conical. When the electrodes are so arranged in the fuel cell that the wide ends of the capillaries face the operating gas supply and receive the gas while the narrow ends of the conical capillaries face the electrolyte, bubbling of the gas through the electrode pores into the electrolyte will definitely be prevented. With such electrodes, it is easy to adjust the pressure of the operating gas so that the necessary three-phase boundary electrolyte-gas-electrode is established within each capillary to cause the desired electrochemical conversion. Furthermore, the gas pressure may be so adjusted that this three-phase boundary is established in the most favorable region of the electrode capillaries.

The number and diameter of the capillaries in the gel membrane may be determined within limits by suitably selecting the electrolyte cation and their concentration in the electrolyte solution. Thus, it has been found that the capillary diameter increases with a decrease of the ion concentration in the electrolyte. Lead produces the smallest diameter capillaries while copper produces capillaries of the most uniform shape. At any rate, these conditions are chosen so that the number of capillaries per square centimeter of the geometric surface of the electrode exceeds 50,000, a preferred range being between about 200,000 and 1,200,000 capillaries/sq. cm.

The diameter of the narrow end of the conical capillaries is between $0.5\mu$ and $100\mu$, preferably between $2\mu$ and $30\mu$ when the electrode is to be used as a gas diffusion electrode in fuel cells. The most advantageous narrow end diameter in this case is between about $2\mu$ and $5\mu$.

As stated hereinabove, practically all synthetic resins may be used to stabilize or solidify the gel membrane. Preferred plastics include polyurethanes, urea polymers, polyacrylonitrile, polyvinyl chloride, and polyolefines because these synthetic resins are inert to electrolytes of all types and they impart to the electrode stability and yet desirable elasticity.

For the indicated reasons, such stabilized homeoporous gels are particularly useful as gas diffusion electrodes in fuel cells when their surface has been coated with a suitable catalytic metal. However, they may also serve as the support for electrodes in electrolytic cells since they conduct the electrochemically produced gas in a given direction only. Furthermore, they are useful as depolarizing electrodes in galvanic elements.

In the production of the homeoporous gel, the covering layer free of capillaries, which may be about $25\mu$ to $200\mu$ thick, is cut away by a cut perpendicular to the direction of the capillaries. To avoid smearing of the capillary openings and to keep them fully open, as well as to avoid mechanical deformation of the still unstable gel membrane, this is best accomplished with the use of a vibrating knife. If the resultant homeoporous gel is too thick for the desired purpose, it may then be sliced into several layers by the same means. Also, by suitably selecting the location of the cut, electrodes with capillary openings of the most advantageous diameter in respect of operating gas and electrolyte may be produced, the capillary pressure depending on the diameter of the capillary openings facing the electrolyte.

After the water in the homeoporous gel has been replaced by a synthetic resin to produce a chemically, mechanically and thermally stable homeoporous plate, the outer surface and capillary walls of the plates are coated in any suitable or conventional manner with a desired electrode material which must be electrically conductive and, in the case of fuel cell electrodes, catalytically active.

Metallizing of the plates may be effected chemically, electrochemically, or physically, for instance, by metal vaporization in a vacuum. The most advantageous metallizing method, however, is the immersion of the homeoporous plate into a metal salt solution, the metal cation being so selected as to produce the desired metal electrode. Catalytically active metals for fuel cell electrodes include, for instance, silver, platinum, palladium, nickel, and others. Very dilute metal salt solutions are useful for this purpose, for instance, a 1.5% silver nitrate solution for the production of silver electrodes. Subsequent reduction of the salt ions to the metallic element may be effected with conventional reducing agents. Very strong reducing agents, such as hydrazine, may be preferred for many purposes since the rapid precipitation of the metal produces a rough coating of consequently larger surface, which is an advantage for the activity of the electrode without interfering with its electrical conductivity.

It is, of course, also possible to coat the homeoporous plate with a plurality of superimposed metal films. This will be advantageous particularly in such cases where the metal is not fully corrosion-resistant under the given operating conditions of the electrode. Also, the coating thickness or number of metal layers deposited on the capillary walls may be used to determine the final diameter of the capillaries in the electrode. Alternatively, this last purpose may be accomplished by wetting the capillary walls with a solution of a monomer or a polymer of a suitable synthetic resin. When the solvent is removed, for instance, by heating, the synthetic resin will form a pellicle on the capillary walls, thus reducing the diameter of the capillaries. Of course, a similar result may be achieved by originally using an excess amount of synthetic resin over that required to replace the water in the gel membrane in the stabilization of the membrane.

The following examples will illustrate the production of electrodes according to the present invention.

*Example 1*

A 1% aqueous colloidal solution of sodium alginate was placed in a flat dish and covered with an N cupric nitrate solution. As shown in FIGS. 1 to 3, an ionotropic gel began to form immediately by the migration of copper ions into the sodium alginate sol and the gel layer was permitted to grow for 180 minutes. Afterwards, the gel was removed from the dish and washed with distilled water to remove excess sol as well as the copper nitrate ions. The covering layer and the portion of the gel containing no capillaries was then removed with a vibrating knife and the remaining homeoporous gel layer was sliced into membranes of 3 mm. thickness.

The homeoporous gel membranes were then chemically, mechanically, and thermally stabilized in the following manner:

The gel water was displaced by acetone and then a 50% acetone solution of 5 parts, by weight, of hexamethylene diisocyanate and 6 parts, by weight, of polyethylene glycol of a molecular weight of 200 was used to replace the acetone. To accelerate the formation of the polyurethane resin, the gel membrane was then placed in a drying oven at a temperature of about 50° to 80° C. for 20 minutes. The stabilized membrane was then immersed in a 10% solution of palladium chloride $PdCl_2$ and a vacuum was applied to assure complete impregnation of the capillaries with the metal salt solution. Afterwards, the impregnated membranes were suspended in hydrazine vapor to reduce the cations to metallic palladium.

This homeoporous body was mounted as a hydrogen electrode in a fuel cell operating with hydrogen as a fuel and oxygen as an oxidizing gas, the oxygen electrode being of nickel and the electrolyte consisting of 6 N potassium hydroxide solution.

This fuel cell was tested against a saturated calomel electrode and operated at room temperature and with a gas pressure of 0.3 atm. gauge. The hydrogen electrode showed an open circuit voltage of −1130 mv. in relation to the calomel electrode. When a load of 200 ma./sq. cm. was applied, the potential in relation to the calomel electrode was 980 mv.

*Example 2*

The ionotropic gel was produced in 100 minutes in the same manner as in Example 1 from a 2% sodium pectinate solution and an N lead nitrate $Pb(NO_3)_2$ solution. The water in the gel membrane was replaced for the purpose of stabilizing the membrane with a 50% solution of hexamethylene diisocyanate in acetone. A urea polymer was formed by placing the gel in a hot water bath having a temperature of 70° C. to 80° C. for 15 minutes. The stabilized gel membrane was then impregnated in a vacuum with a 5% solution of chloro platinic acid $H_2PtCl_6$, removed from the impregnation bath, and a metallic platinum film was precipitated on the entire membrane surface by reduction in formic acid vapor.

The resultant homeoporous electrode was tested in a 2 N sulfuric acid electrolyte wherein a platinum sheet was used as counter electrode. In relation to a saturated calomel electrode, the open circuit voltage of the electrode was −251 mv. At a permanent load of 100 ma./sq. cm., the electrode showed a polarization of 95 mv. (−156 mv. in relation to a saturated calomel electrode).

*Example 3*

Proceeding similarly to Example 1 with a 1.5% solution of sodium carboxymethyl cellulose and a solution of N cadmium nitrate $Cd(NO_3)_2$, the gel growth was interrupted when the membrane had reached a thickness of 5 mm., whereupon the membrane was removed from the flat dish and the non-porous gel portion facing the cadmium electrolyte was sliced off the homeoporous gel portion with a vibrating knife. The diameters of the capillaries were found to be rather large ($15\mu$ to $28\mu$). A palladium electrode was prepared from the stabilized gel in accordance with Example 1, by impregnation with a palladium chloride solution and reduction to metallic palladium by exposure to hydrazine vapors.

Figure 6:
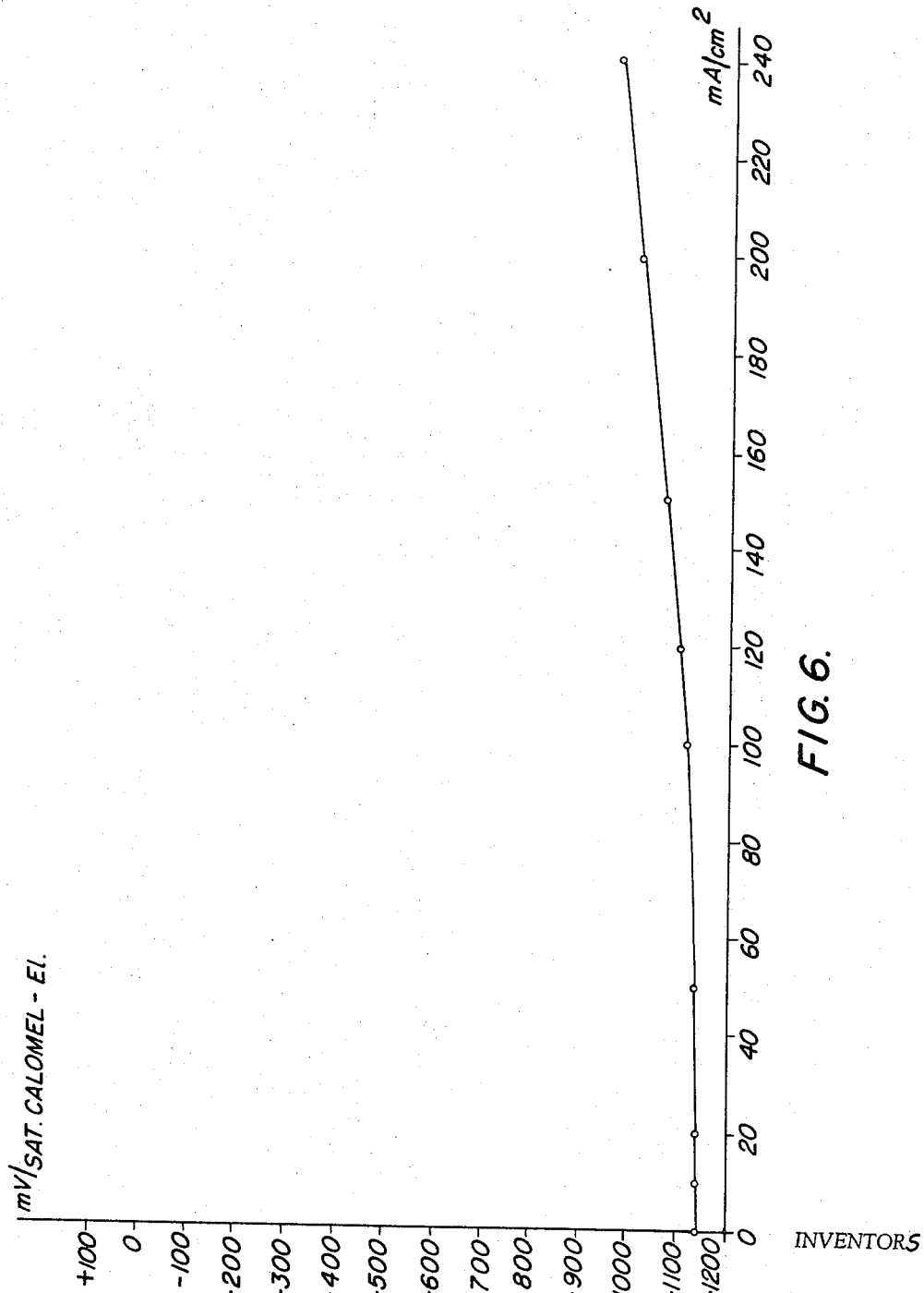

This electrode was tested with a nickel sheet as counter electrode, against a saturated calomel electrode. Ethylene glycol was used as liquid fuel and was dissolved in 5.3 N potassium hydroxide solution in a ratio of 2 moles of fuel per mole of electrolyte. The result is shown in the voltage curve of FIG. 6.

*Example 4*

The homeoporous layer of the gel of Example 1 was stabilized by displacing its water with acetone and then replacing the acetone with a 45% solution of polypropylene in decalin. After the decalin has been evaporated by slowly heating in a vacuum, a polypropylene-reenforced membrane was obtained. This membrane was heated to 140° C. and nickel carbonyl was simultaneously sucked through its capillaries. At this temperature, the nickel carbonyl was decomposed on the membrane surfaces as well as inside the capillaries and precipitated thereon as finely distributed nickel metal.

The resultant electrode was used as a hydrogen electrode in a fuel cell, with silver as oxygen electrode and a 6 N potassium hyroxide electrolyte. At 60° C., the cell was operated continuously with a load of 130 ma./sq. cm. and a total voltage of 0.65 v.

*Example 5*

The homeoporous stabilized gel of Example 4 was immersed in a 10% solution of palladium chloride $PdCl_2$ after the nickel had been precipitated by thermal decomposition of nickel carbonyl. To assure complete inundation of the capillaries in the palladium chloride solution, vacuum was applied several times. Afterwards, the palladium ions were reduced by placing the membrane into a 5% hydrazine solution for a short period of time, whereupon the membrane was removed from the reducing bath and washed with distilled water.

Figure 5:
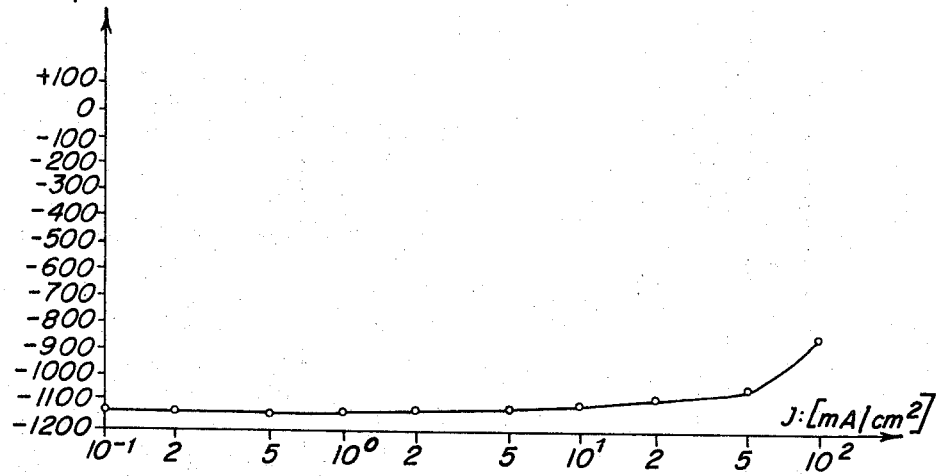
FIGS. 5 and 6 are graphs illustrating the operation of fuel cells with electrodes according to this invention.

The resultant electrode was used as hydrogen electrode in a fuel cell and a Raney silver electrode produced according to German Patent No. 1,109,752 was used as oxygen electrode in the cell. FIG. 5 shows the voltage curve of the cell operation.

*Example 6*

Example 1 was repeated but, in order to narrow the capillaries, i.e. reduce their diameters, the concentration of the monomers in the acetone solution was increased to 90% so that the resultant polyurethane mass did not only fill the original gel skeleton but also formed films over the capillary walls.

Thus, a suitable change in the monomer concentration may be used to control the capillary diameter in any desired manner.

The same result will be achieved by proceeding according to Example 4 and suitably increasing the polymer concentration, i.e. the polypropylene amount in the decalin solvent.

*Example 7*

A homeoporous gel was prepared and stabilized according to Example 2 but impregnated in a vacuum with a 15% silver nitrate solution containing 3% of free nitric acid. The plate was removed from the impregnation bath and excess solution permitted to drip off, whereupon the silver nitrate was reduced by immersing the plate in a 5% weakly alkaline formaldehyde solution to precipitate finely divided metallic silver on the plate surface.

This electrode was used as oxygen electrode in a fuel cell.

*Example 8*

The nickel-plated electrode of Example 4 was immersed in a solution of chloro platinic acid $H_2PtCl_6$ and platinum was cathodically precipitated on the walls of the capillaries as well as the other surfaces. The resultant electrode was used as a hydrogen electrode in a fuel cell with the oxygen electrode of Example 7.

*Example 9*

The stabilized electrode of Example 1 was immersed in a 24% hydrazine solution to reduce the copper ions in the copper alginate to metallic copper.

The homeoporous electrode was then nickel-plated according to the following procedure:

The electrode was treated for an hour at a temperature of 90° C. in a solution containing, per liter, 30 g. of nickel chloride $NiCl_2$, 10 g. of sodium hypophosphite, 97 g. of sodium citrate, 47.5 g. of ammonium chloride $NH_4Cl$, and enough ammonia $NH_3$, to adjust the pH value of the solution to a pH of 9.15. Afterwards, the nickel-plated electrode was thoroughly washed with water, immersed in a 15%, weakly acidic silver nitrate solution and silver was cathodically deposited on the electrode surfaces.

The resultant electrode was used as oxygen electrode in fuel cells.

*Example 10*

The palladium-plated electrode of Example 1 is electrolytically coated on the side adjacent the smaller capillary openings with a copper film. This is effected by immersing the electrode, the reverse side of which has been covered, for instance, by a removable lacquer or adhesive pellicle, in a 15% copper sulfate solution which contains 50 g./l. of concentrated sulfuric acid and 50 g./l. of ethyl alcohol. Electrolyte copper is used as the anode in the electrolytic bath.

Such an electrode was found useful as hydrogen electrode in fuel cells. It may also be used for the electrolytic production of hydrogen. Since copper has a considerably higher hydrogen potential, the recombination of the hydrogen is effected only on the reverse side of the electrode on the palladium coating. Thus, the hydrogen migrates to the gas side of the electrode and may be collected there. The electrode of Example 7 is used as counter-electrode, the side of the electrode adjacent the smaller capillary openings having been coated with titanium by vacuum vaporization.

In the latter case, too, the gas, i.e. the oxygen, migrates during electrolysis through the titanium coating, is recombined at the silver layer and is collected behind the electrode since the titanium has a higher oxygen potential.

This method of collecting and recovering the chemical energy of the operating gas is known but the described electrode makes it much easier while not diminishing its effectiveness.

In addition to the manufacture of electrodes, the present invention is also useful in the preparation of fuel cells with a solid electrolyte. The use of solid electrolytes in fuel cells is known. However, such known ion exchange membranes have the disadvantage of becoming brittle when dry. In other words, when the fuel cell operation is interrupted, the solid electrolyte dries out and cannot be used again. Furthermore, keeping the electrolyte moist during operation requires technical measures, such as working with moist operating gases, the provision of water-absorbing wicks, and the like.

Conventional ion exchange membranes are more or less impermeable on both surfaces facing the electrodes and their mechanical rigidity is relatively unsatisfactory. All this makes it difficult to develop the required three-phase boundary between operating gas, catalytic electrode, and electrolyte, which is necessary to produce the desired electrochemical conversion leading to the delivery of electrical energy. Obviously, if the boundary surfaces are flat, the load of the cell per unit of surface area will be reduced.

These and other disadvantages are avoided if the stabilized poly-electrolyte gel, which is homeoporous on one surface, is used as a solid ion exchange electrolyte in a fuel cell. The polyelectrolyte gel forms the electrolyte and the two surfaces thereof are merely covered with a suitable catalytically active metal to form the oxygen and hydrogen electrodes, respectively. This may be done in any conventional or suitable manner, such as described hereinabove in connection with the metallizing of the stabilized homeoporous gel for the purpose of producing an electrode. However, the two sides of the gel will, of course, be coated by respective catalytic metals effective for the activation of hydrogen and oxygen, respectively, also in contrast to the production of the electrodes, the non-porous covering layer of the gel will remain attached to the homeoporous layer to constitute the electrolyte.

Figure 7:
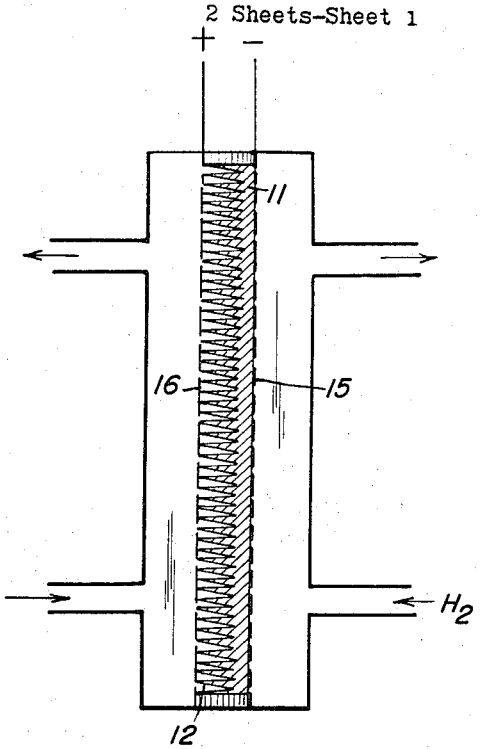
FIG. 7 diagrammatically illustrates a fuel cell with the ion exchanging intact gel with the homeoporous layer and the non-porous covering layer.

As is conventional, the catalytic electrode coatings will be connected to electric current conductors of preferably large contact surfaces, sieves, grids, nets, and the like being useful for this purpose. A hydrogen-oxygen fuel cell using a stabilized polyelectrolyte gel according to this invention is shown in FIG. 7. Mounted in the cell container and dividing the same into an oxygen supply chamber and a hydrogen supply chamber is the stabilized polyelectrolyte gel 11 constructed according to the invention. The homeoporous surface of the gel is coated with an oxygen activating catalytic metal and the flat surface is coated with a hydrogen activating catalytic metal. The current conducting nets 15 and 16 are in contact with the metallized surfaces of the gel. The operation of the cell is conventional and proceeds as follows:

As the operating gases are supplied to the respective metallized surfaces the following ensues:

The hydrogen ions produced from the gaseous hydrogen pass through the ion exchanging gel to the homeoporous side of the gel and are combined there into water with the hydroxyl ions produced from the gaseous oxygen at the oxygen side according to the following equation:

$$O_2 + 2H_2O + 4e^- = 4OH^-$$

This shows that water is formed at a point where half of the formed water is used up to produce new $OH^-$ ions. The excess water flows out of the conical capillaries 12.

Obviously, the hydrogen-oxygen system may be replaced by other known fuel cell systems, such as carbon monoxide-oxygen or hydrazine-air.

It is a particular advantage of such polyelectrolyte gels that the porous surface thereof has an area about five times that of its flat side. Since the formation of hydroxyl ions in the hydrogen-oxygen system determines the speed of the electric current production, the porous surface being the oxygen electrode will be used up less per area unit at a given load. Furthermore, this solid electrolyte is mechanically stable but insensitive to drying out or becoming brittle.

The following examples will illustrate this aspect of the invention:

Example 11

An ionotropic gel was produced in a glass dish according to Example 1 but left to grow for only 20 minutes. Further in contrast to Example 1 the covering layer was not removed. After stabilizing the copper alginate gel was then treated with 10% hydrochloric acid solution to exchange the copper ions and then palladium was vaporized onto the flat and non-porous surface of the thus treated gel. The palladium coating was covered with a lacquer layer and the gel was immersed in a 15% silver nitrate, $AgNO_3$, solution. To assure complete impregnation of the capillaries, the immersion was effected in a vacuum. The silver ions were reduced by immersing the impregnated membrane in a 1% hydrazine hydrate solution. After this treatment, the lacquer coating was removed from the palladium surface and a silver wire was applied as current conductor to the palladium-coated and the silver-coated sides.

This electrolyte-electrodes assembly was built into a container to operate as a fuel cell, as shown in FIG. 7 and oxygen and hydrogen were supplied thereto at an approximate pressure of 0.2 atm. gauge. The operating surface of the gel was about 25 sq. cm. and the open circuit voltage of the cell was 0.97 v. The cell sustained a load of 50 ma./sq. cm. at 0.7 v.

Example 12

Example 11 was repeated, except that platinum was used as a catalyst for the hydrogen and the impregnation solution for the oxygen side of the gel consisted of an aqueous solution containing 15% of silver nitrate, 5% of ammonium vanadate $NH_4VO_3$, 5% of ferrous nitrate $Fe(NO_3)_2$, and 1% of manganous nitrate $Mn(NO_3)_2$, the impregnation and reduction being repeated once.

When operating, this fuel cell had an open circuit voltage of 1.05 v. and sustained a load of 60 ma./sq. cm. at 0.75 v.

Example 13

Example 11 was repeated but the impregnation solution for the oxygen side of the gel consisted of an aqueous solution containing 12% of silver nitrate $AgNO_3$, 1% of ferrous nitrate $Fe(NO_3)_2$ and 0.1% of osmium tetroxide $OsO_4$, the reduction being effected in a 1.2% hydrazine hydrate solution.

This hydrogen-oxygen fuel cell delivered an open circuit voltage of 1.06 v. and sustained a load of 50 ma./sq. cm. in a continuing operation, with a polarization of about 300 mv.

Example 14

The copper alginate gel of Example 1 was stabilized by displacing the gel water by acetone and then displacing the acetone in a vibrator by a mixture of equal parts, by weight, of carbon disulfide and acetone. This gel was impregnated for 15 minutes with a solution of 10 g. of a low-molecular polyvinylchloride in 45 g. of acetone and 45 g. of carbon disulfide, with an addition of 6.65 g. of dibutyl phthalate as plasticizer. Afterwards, the stabilized gel was placed between filter paper at room temperature and lightly pressed. The filter paper, which absorbed the solvent, was repeatedly replaced. After 30 minutes, all of the solvent was removed and the membrane was stable and flexible. In the direction of the capillaries, some shrinkage was observed but neither the capillary diameters nor their even distribution was in any way disturbed.

Of course, other polyelectrolytes, their alkali metal salts, non-alkali metal salts, synthetic resins for stabilizing the polyelectrolyte gel, other methods of producing the stabilized polyelectrolyte gel according to the present invention may be used by the skilled in the art in accordance with the principles set forth herein and in the claims annexed hereto.

Thus it is, for instance, possible first to exchange the non-alkali metal in the porous polyelectrolyte gel by a treatment with an acid forming a water soluble metal salt solution and then stabilizing the resulting acidic gel as described hereinabove. This procedure, however, requires careful operation because the acidic gel is not as stable as a non-alkali metal gel. Therefore, the procedure as described in detail in the preceding examples is the preferred one. It is, of course, also possible to employ several stabilizing methods for stabilizing the polyelectrolyte gel. For instance, the diisocyanate impregnated polyelectrolyte gel may be treated with insufficient amounts of the respective diol and, subsequently, by immersing into a hot water bath. In this manner a gel results which is stabilized by a polyurethane-polyurea resin. Other combination stabilization may also be effected.

It is also possible to remove the non-porous layer from the homeoporous multiporous gel layer after the gel has been stabilized by means of a synthetic resin if a resin is used which is readily workable.

We claim:

1. A solidified polyelectrolyte gel consisting of a gel of a polyelectrolyte selected from the group consisting of alginates, pectins and carboxymethyl cellulose, said gel being reenforced and stabilized with a synthetic resin, said gel having two opposite surfaces, at least one of said surfaces being constituted by a homeoporous layer defining a multiplicity of evenly distributed and parallel capillaries of substantially the same size and shape, and all surfaces of the homeoporous layer being covered by an electrically conductive metal.

2. The solidified polyelectrolyte gel of claim 1, wherein the capillaries are conical.

3. The solidified polyelectrolyte gel of claim 1, wherein each square centimeter of the homeoporous layer has more than 50,000 capillaries.

4. The solidified polyelectrolyte gel of claim 3, wherein each square centimeter of the homeoporous layer has from about 200,000 capillaries to about 1,200,000 capillaries.

5. The solidified polyelectrolyte gel of claim 2, wherein the diameter of the narrow end of the conical capillaries is from about $0.5\mu$ to about $100\mu$.

6. The solidified polyelectrolyte gel of claim 5, wherein the diameter of the narrow end of the conical capillaries is from about $2\mu$ to about $30\mu$.

7. The solidified polyelectrolyte gel of claim 2, wherein the synthetic resin is selected from the group consisting of polyurethanes, urea polymers, acrylic polymers, polyvinylchloride, and polyolefins.

8. The solidified polyelectrolyte gel of claim 1, wherein the polyelectrolyte is an alginate.

9. The solidified polyelectrolyte gel of claim 1, wherein both of said opposite surfaces are homeoporous, said capillaries extending from one of the surfaces to the other surface.

10. The solidified polyelectrolyte gel of claim 1, wherein said electrically conductive metal is catalytically active for an operating gas of a fuel cell, whereby the gel may serve as a fuel cell electrode.

11. The solidified polyelectrolyte gel of claim 1, wherein one of said opposite surfaces is constituted by said homeoporous layer while another non-porous layer constitutes a flat surface opposite thereto, the flat surface being covered by another electrically conductive metal, the conductive metal covering of the one surface being catalytically active for one operating gas of a fuel cell and the conductive metal covering the other surface being catalytically active for the other operating gas of the fuel cell.

12. A fuel cell comprising a negative electrode, a positive electrode, and a solid polyelectrolyte gel between said electrodes, the gel of a polyelectrolyte selected from the group consisting of alginates, pectins and carboxymethyl cellulose, said gel being reenforced and stabilized by a synthetic resin, the gel having one surface constituted by a homeoporous layer defining a multiplicity of evenly distributed and parallel capillaries of substantially the same size and shape, and an opposite surface constituted by a non-porous layer.

13. The fuel cell of claim 12, wherein the positive electrode faces the homeoporous surface.

14. A method of manufacturing a homeoporous gas diffusion electrode, comprising the steps of producing an ionotropic aqueous gel of a polyelectrolyte selected from the group consisting of alginates, pectins and carboxymethyl cellulose, said gel consisting of a non-porous layer and a layer defining a multiplicity of evenly distributed and parallel capillaries of substantially the same size and shape, removing the non-porous layer by cutting perpendicularly to the capillaries, stabilizing the resultant homeoporous gel by replacing the water therein with a synthetic resin, and coating all surfaces of the stabilized homeoporous gel with an electrically conductive metal.

15. The method of claim 14, wherein the ionotropic gel is produced by covering a layer of an aqueous sol of the polyelectrolyte with a layer of an aqueous solution of a water-soluble, non-alkali metal salt, wherein the non-alkali metal is selected from the group consisting of copper, lead, and beryllium.

16. The method of claim 14, wherein the polyelectrolyte is an alginate.

17. The method of claim 14, wherein the surfaces of the stabilized homeoporous gel are coated by immersing the gel into a solution of a salt of said metal and the metal ions are subsequently reduced on the gel surfaces.

18. The method of claim 17, wherein the metal ions are reduced wtih a strong reducing agent to produce a rough surface.

19. The method of claim 18, wherein the reducing agent is hydrazine.

20. The method of claim 14, wherein the surfaces are coated repeatedly with said metal until the capillaries have the desired diameter.

21. The method of claim 14, wherein the amount of synthetic resin is chosen to replace a volume exceeding the volume of the water in the gel whereby the diameters of the capillaries are reduced by the stabilization.

22. The method of claim 14, wherein the capillaries of the stabilized gel are coated with additional synthetic resin to reduce their diameters.

References Cited

UNITED STATES PATENTS

| | | | |
|---|---|---|---|
| 2,505,353 | 4/1960 | Fisk. | |
| 2,942,057 | 6/1960 | Huber et al. | 136—146 X |
| 3,215,563 | 11/1965 | Clemm | 136—86 |
| 3,216,882 | 11/1965 | Feldt et al. | 136—86 X |

FOREIGN PATENTS

| | | |
|---|---|---|
| 379,235 | 8/1932 | Great Britain. |
| 394,803 | 7/1933 | Great Britain. |

ALLEN B. CURTIS, *Primary Examiner.*

WINSTON A. DOUGLAS, *Examiner.*